United States Patent [19]

Tsuboi et al.

[11] Patent Number: 5,282,058
[45] Date of Patent: Jan. 25, 1994

[54] FACSIMILE DEVICE HAVING IMPROVED PRINTING PROCESS WITH CUT PAPER

[75] Inventors: Toshio Tsuboi, Ramsey, N.J.; Munehiro Nakatani, Toyohashi; Shigenobu Fukushima, Yao, both of Japan

[73] Assignee: Minolta Camera Kabushiki Kaisha, Osaka, Japan

[21] Appl. No.: 777,995

[22] Filed: Oct. 17, 1991

[30] Foreign Application Priority Data

Oct. 22, 1990 [JP] Japan ................................. 2-284957
Oct. 22, 1990 [JP] Japan ................................. 2-284958

[51] Int. Cl.⁵ .......................................... H04N 1/387
[52] U.S. Cl. ..................................... 358/449; 358/453
[58] Field of Search ............... 358/451, 449, 453, 468, 358/444, 435, 436, 426, 442

[56] References Cited

U.S. PATENT DOCUMENTS 4,679,093 7/1987 Yaguchi ............................. 358/449
4,706,127 11/1987 Nobuta ............................... 358/449
4,805,135 2/1989 Ochi et al. .
4,924,324 5/1990 Takaoka ............................. 358/449
5,033,106 7/1991 Kita .................................... 358/426

Primary Examiner—Edward L. Coles, Sr.
Assistant Examiner—Scott A. Rogers
Attorney, Agent, or Firm—Willian Brinks Hofer Gilson & Lione

[57] ABSTRACT

A facsimile device according to the present invention includes a reception device for receiving compressed image data, a memory for storing the compressed image data, a first expansion device for expanding the stored compressed image data, a detection comparison device for detecting the amount of the expanded image data and obtaining the difference between the amount and a prescribed value, a second expansion device for expanding the stored compressed image data again after the detection by the detection comparison device, an image formation device for forming an image on paper based on the image data expanded again, and a control device for controlling the image formation device based on the difference obtained by the detection comparison device.

9 Claims, 11 Drawing Sheets

FIG. 3

| SYSTEM | CONTENTS |
|---|---|
| MH | ONE-DIMENSIONAL ENCODING OF DATA OF ALL THE SCANNING LINES |
| MR | TWO-DIMENSIONAL ENCODING OF A MAXIMUM OF K-1 CONTINUOUS SCANNING LINES AFTER ONE-DIMENSIONAL ENCODING OF ONE SCANNING LINE, WHEREIN THE VALUE OF K=2 IN THE CASE OF NORMAL RESOLUTION WHILE IT IS 4 IN THE CASE OF HIGH RESOLUTION |
| MMR | TWO DIMENSIONAL ENCODING OF ALL THE SCANNING LINES WHEN ENCODING THE FIRST LINE, SUPPOSE THAT THE WHOLE IMAGINARY WHITE LINE IS A REFERENCE LINE IMMEDIATELY BEFORE THE LINE TO BE ENCODED |

FACSIMILE DEVICE HAVING IMPROVED PRINTING PROCESS WITH CUT PAPER

BACKGROUND OF THE INVENTION

1. Field of the Invention

The present invention relates generally to facsimile devices and, more particularly, relates to facsimile devices for holding received data once and then performing a printing process using cut paper.

2. Description of the Related Art

In recent years, there have been an increasing number of facsimile devices which employ, as recording paper, cut paper cut to a prescribed size in place of rolled paper for the sake of convenience in filing.

U.S. Pat. No. 4,731,658 discloses a facsimile device for performing a printing process using cut paper. The facsimile device has an image memory capable of storing an image having a length of data of one sheet of recording paper with additional information such as call origination printing and a margin portion added to it. When the received data is long or it is an image data equal to or larger than the normal cut paper, having the call origination printing, the reception printing and so on added to it, the facsimile device, for an image data having a length equal to or larger than the cut paper in the feed direction, reduces the image to one sheet of cut paper if it has a length smaller than a prescribed value, or divides the image data into a plurality of sheets of cut paper for printing if it has a length equal to or larger than the prescribed value.

The conventional facsimile device as stated above is structured based on the assumption that it has an image memory capable of storing an image having a length of data of one sheet of recording paper and additional information such as call origination printing and a margin portion added to it since it is necessary to know the image size of one page of the received data to be printed before starting printing. However, provision of such a memory is disadvantageous with regard to cost. For example, an extremely large memory capacity of 6M bytes is required in order to store one page of data with a printer of A4 size.

SUMMARY OF THE INVENTION

An object of the present invention is to perform an appropriate recording in a facsimile device using cut paper.

Another object of the present invention is to perform an efficient recording in a facsimile device using cut paper.

Still another object of the present invention is to realize a more economical use of a facsimile device using cut paper.

In order to achieve the above-mentioned objects, a facsimile device according to one aspect of the present invention includes reception means for receiving compressed image data transmitted by another facsimile device, storage means for storing the compressed image data received by the reception means, first expansion means for expanding the compressed image data stored in the storage means, a detection device for detecting the amount of the image data expanded by the first expansion means, comparison means for comparing the amount of the image data detected by the detection device with a prescribed value and obtaining the difference therebetween, second expansion means for expanding again the compressed image data stored in the storage means after detection by the detection means, image forming means for forming an image on paper based on the image data expanded by the second expansion means, and control means for controlling the image forming means based on the difference obtained by the comparison means.

In the facsimile device structured as stated above, formation of the image is controlled based on the difference between the amount of the received image data and the prescribed value, so that efficient recording is made possible.

In order to achieve the above-mentioned objects, a facsimile device according to another aspect of the present invention includes reception means for receiving a plurality of pages of code data transmitted by another facsimile device, decode means for decoding the code data received by the reception means to image data, print means for printing an image corresponding to the image data decoded by the decode means on paper, count means for counting the length of image corresponding to one page of the image data decoded by the decode means, first control means for inhibiting printing of the image data decoded after the counted value by the count means reaches a first prescribed value, and second control means for controlling the decode means so as to decode again the decoded code data to image data after the counted value reaches the first prescribed value when the excess amount of the counted value with respect to the first prescribed value is larger than a second prescribed value.

The facsimile device structured as stated above decodes again the decoded code data to image data after the counted value reaches the first prescribed value when the excess amount of the counted value with respect to the first prescribed value is larger than the second prescribed value, so that an image memory of a large storage capacity is not required, making the facsimile device more economical.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 3 is a diagram illustrating various kinds of compressing systems in the facsimile device.

DESCRIPTION OF THE PREFERRED EMBODIMENTS

Figure 1:
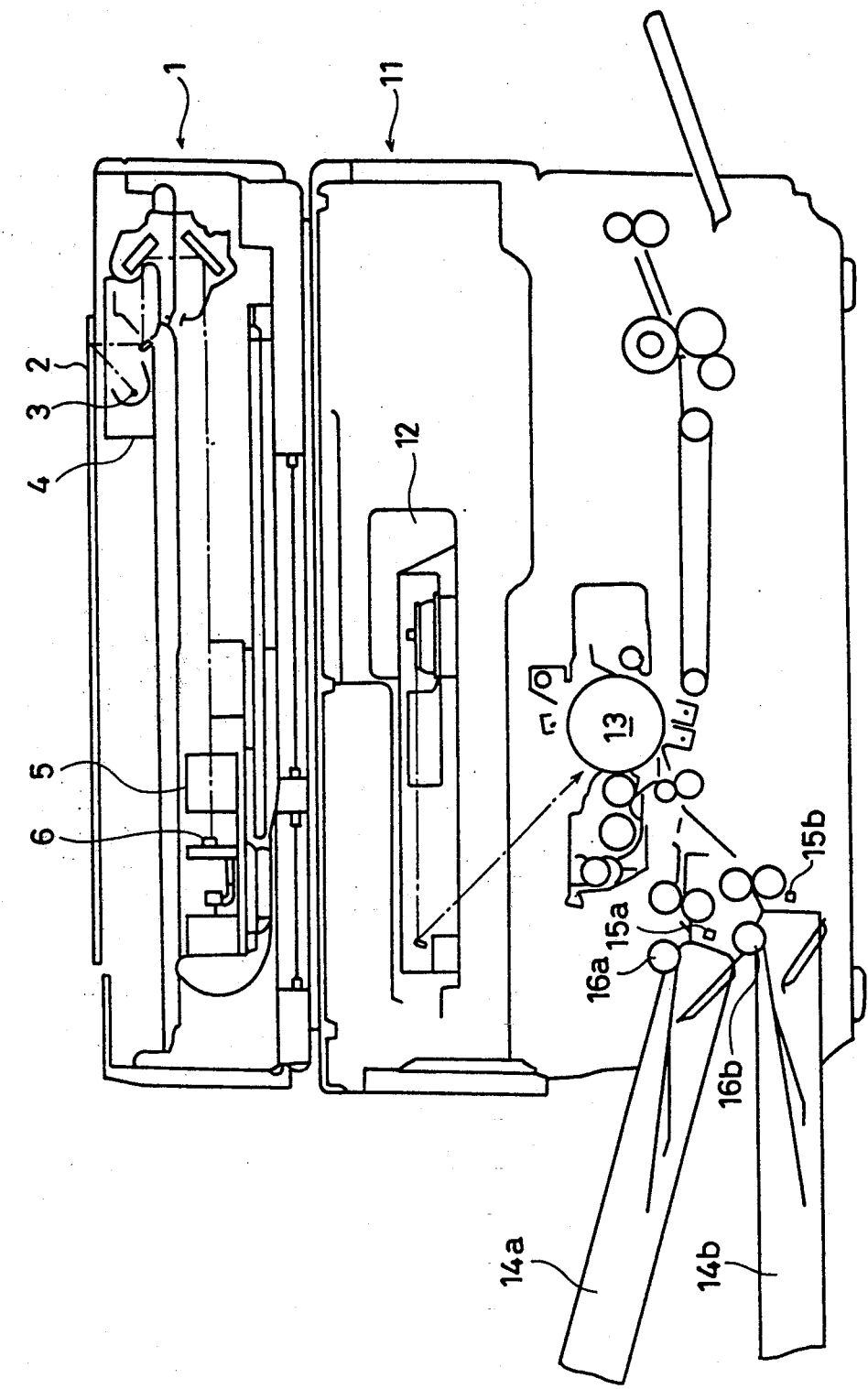
FIG. 1 is a diagram showing a schematic structure of a facsimile device according to a first embodiment of the present invention.

FIG. 1 is a cross-sectional view showing an outline of an original read portion for electrically reading an original to be transmitted and a print portion for printing a received image in a laser facsimile device according to one embodiment of the present invention.

In the figure, an original mounted on a platen 2 is scanned by a scanner irradiating with a light source 3 and moving at the same time in original read portion 1. The reflected light from the original is reflected by a mirror and enters a linear CCD sensor 6 (for example, 8 pixels/mm) through a lens 5. An output signal of linear CCD sensor 6 is digitized and binarized as will be described later. Though the original is fixed in this embodiment, the structure can be further simplified if the reading operation is performed in a original moving style in which the mounted original itself is moved.

Luminescence of the laser diode is controlled based on the received signal at a laser optical system 12 and a laser light enters a photoreceptor 13 in a print portion 11. Then, developing, transferring, fixing and so on are performed by the well-known electrophotographic process and the received signal is printed on plain paper fed from a paper feed cassette 14a or 14b. As the reading and printing operations are the same as those in the conventional laser printer, a detailed description thereof will not be repeated here.

Paper size sensors 15a and 15b are provided in print portion 11, for detecting the size of the paper stored in paper feed cassettes 14a and 14b in the well-known manner. In printing, either of the paper feed cassettes is selected corresponding to a signal (included in a preceding procedure signal supplied ahead of the image data by the facsimile on the transmission side) indicating the image size based on the result of the detection by 7 paper size sensors 15a, 15b, and the paper is fed to an image forming portion by selectively driving one of paper feed rollers 16a, 16b corresponding to the selected paper feed cassette.

The outline of the operation of the facsimile device in FIG. 1 will now be described with reference to FIG. 2.

Firstly, the operation on the side of the caller will be described.

The image of the original is converted into an electric signal by a photoelectric transferring portion 31 including linear CCD sensor 6 in original read portion 1. Then, a prescribed binarization process (dither process or the like) is performed in a processing portion 32 and it is converted into a binary time sequence signal. The converted data is temporarily stored in a buffer memory 40. Then, the data read out from buffer memory 40 is encoded by a compression portion 33 in the system of MH, MR or the like. Subsequently, the calling side is connected to the side of the callee by a transmission control portion 35 connected to a code memory 34 and the data signal stored in code memory 34 is supplied to the line through a line connection portion 36 in accordance with a prescribed procedure.

The operation on the side of the callee will now be described.

When transmission control portion 35 receives a connection request from the side of the caller through line connection portion 36, the line is connected with the side of caller, the reception signal is received and the signal is stored in code memory 34. An expansion portion 37 expands and decodes the signal stored in code memory 34, and the decoded image signal (dot data) is temporarily stored in buffer memory 40. A record portion 38 includes a laser optical system 12, paper feed rollers 16a and 16b, paper size sensors 15a and 15b and so on and the image signal supplied from buffer memory 40 is printed here on paper as an image. A control portion 39 controls each portion described above in accordance with the operation of an operation display portion 51.

A way of compressing a signal will now be described. Since it takes a long time to directly store an electric signal in the facsimile device and a required memory capacity becomes large, the electric signal is compressed using patterns which are likely to appear (continuity of white signals, continuity of black signals). There are three kinds of systems, that is, MH system, MR system and MMR system as a system of compressing an electric signal as shown in FIG. 3.

One-dimensional encoding is a system in which the continuity length (run length) of pixels of the same color, white pixels and black pixels, alternately appearing on one line is encoded and two-dimensional encoding is a system in which encoding is performed according to the relationship between the position of each change pixel on a scanning line (encoded line) presently being encoded and the position of a corresponding change pixel on the reference line immediately before the encoded line, wherein the change pixel is a first pixel which changed in such a way as white→black, black→white.

Figure 2:
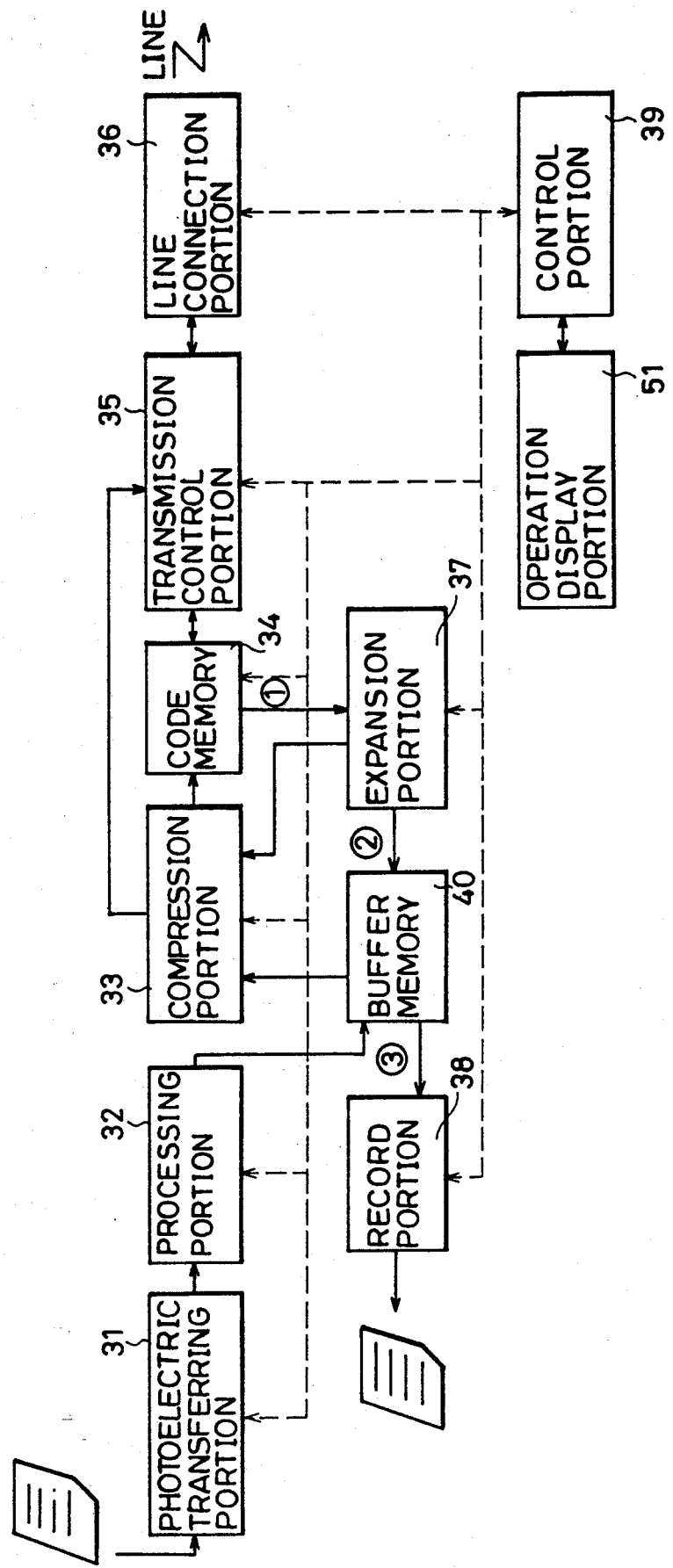
FIG. 2 is a schematic block diagram for describing the operation of the facsimile device in FIG. 1.
Figure 4:
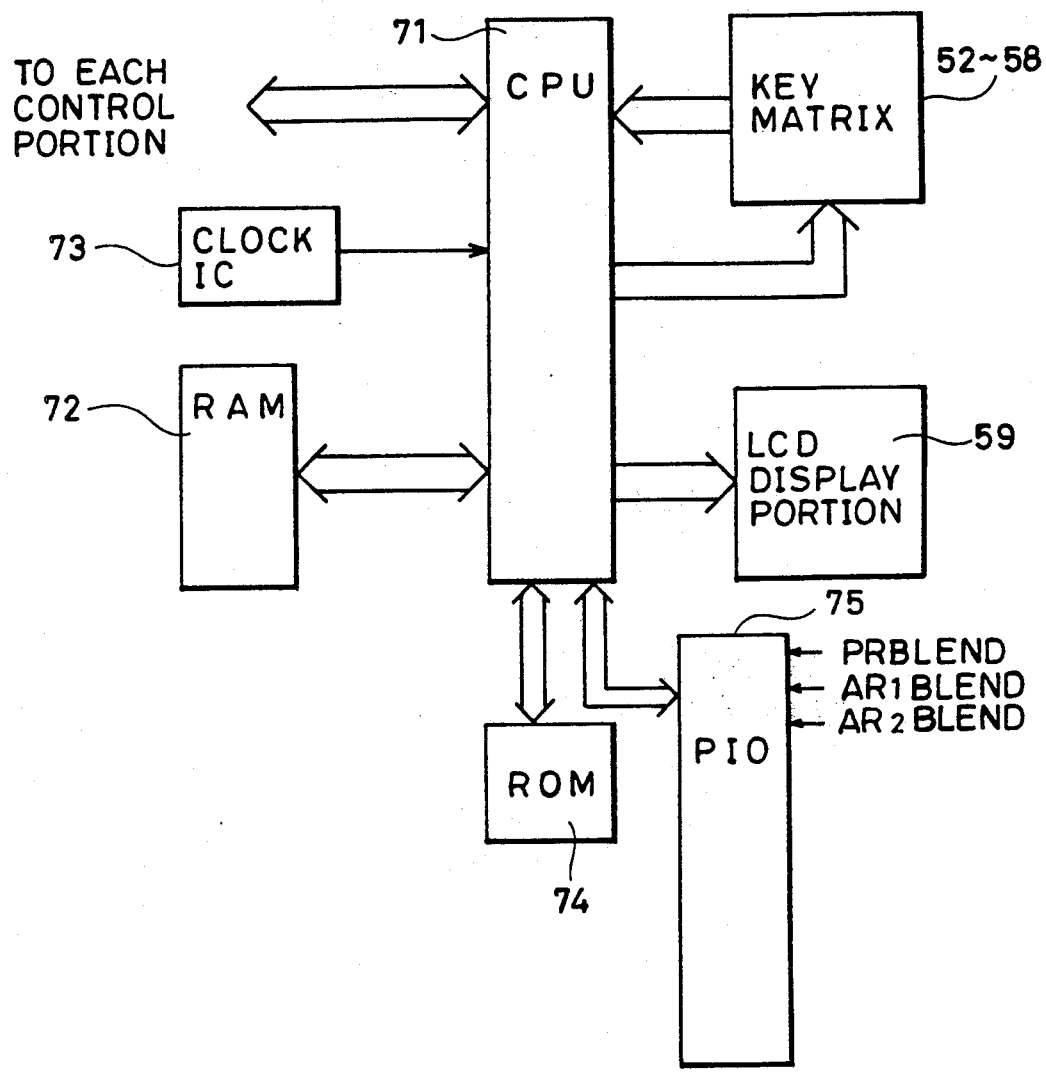
FIG. 4 is a circuit diagram with a CPU included in a control portion 39 of FIG. 2 being at the center.

FIG. 4 is a circuit diagram with a CPU 71 included in control portion 39 of FIG. 2 being at the center. In the figure, a RAM 72 for operation, a clock IC 73 for timer, a ROM 74, and a PIO 75 are connected to CPU 71. Key matrices 52 to 58 of an operation display portion 51 and an LCD display portion 59 are also connected to CPU 71.

Figure 5:
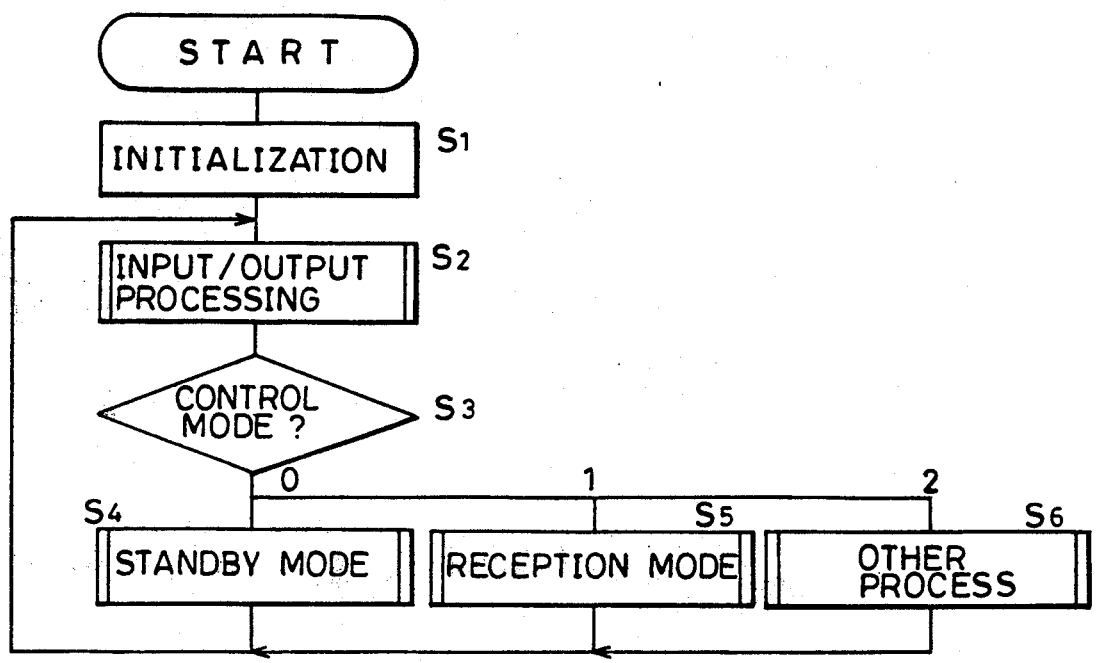
FIG. 5 is a flow chart diagram showing the main operation of CPU 71 of FIG. 4.

FIG. 5 is a flow chart diagram showing the main flow of CPU 71 in FIG. 4.

In step S1, initialization after resetting CPU 71 is performed. An input/output process of CPU 71 is carried out in step S2. In step S3, the control mode changing in accordance with the input signal from PIO 75 is checked and the flow branches to each mode. If the control mode value is "0", the program proceeds to the standby mode of step S4, if it is "1", it proceeds to the reception mode of step S5, and if it is "2", it proceeds to other process of step S6. In the standby mode of step S4, CPU 71 waits for a key operation input or an incoming call signal by the receiving operation. While the device is performing the receiving process, the program carries out the reception mode process of step S5. The subroutine of other process S6 is performed in a process other than the standby mode or the reception mode, such as the transmission mode, or at the time of registering a dialing number used by one touch. After each process is finished, the program returns to step S2.

Figure 6:
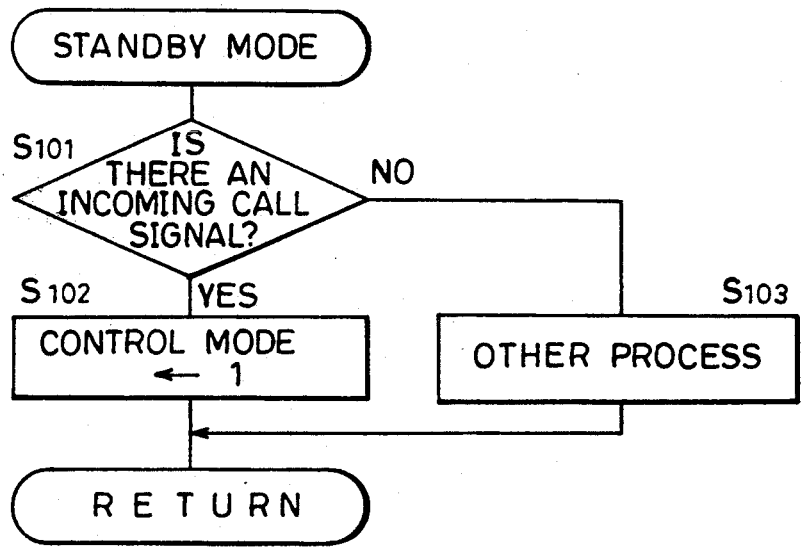
FIG. 6 is a flow chart showing specific contents of the wait mode in FIG. 5.

FIG. 6 is a flow chart diagram showing specific contents of the process of the standby mode (step S4) in FIG. 5.

Input of an incoming call signal is checked in step S101. If the incoming call signal has been inputted, the control mode is set to "1" in step S102 and the flow returns. If the incoming call signal has not been inputted, the program proceeds to step S103, performs other process and returns.

Figure 7:
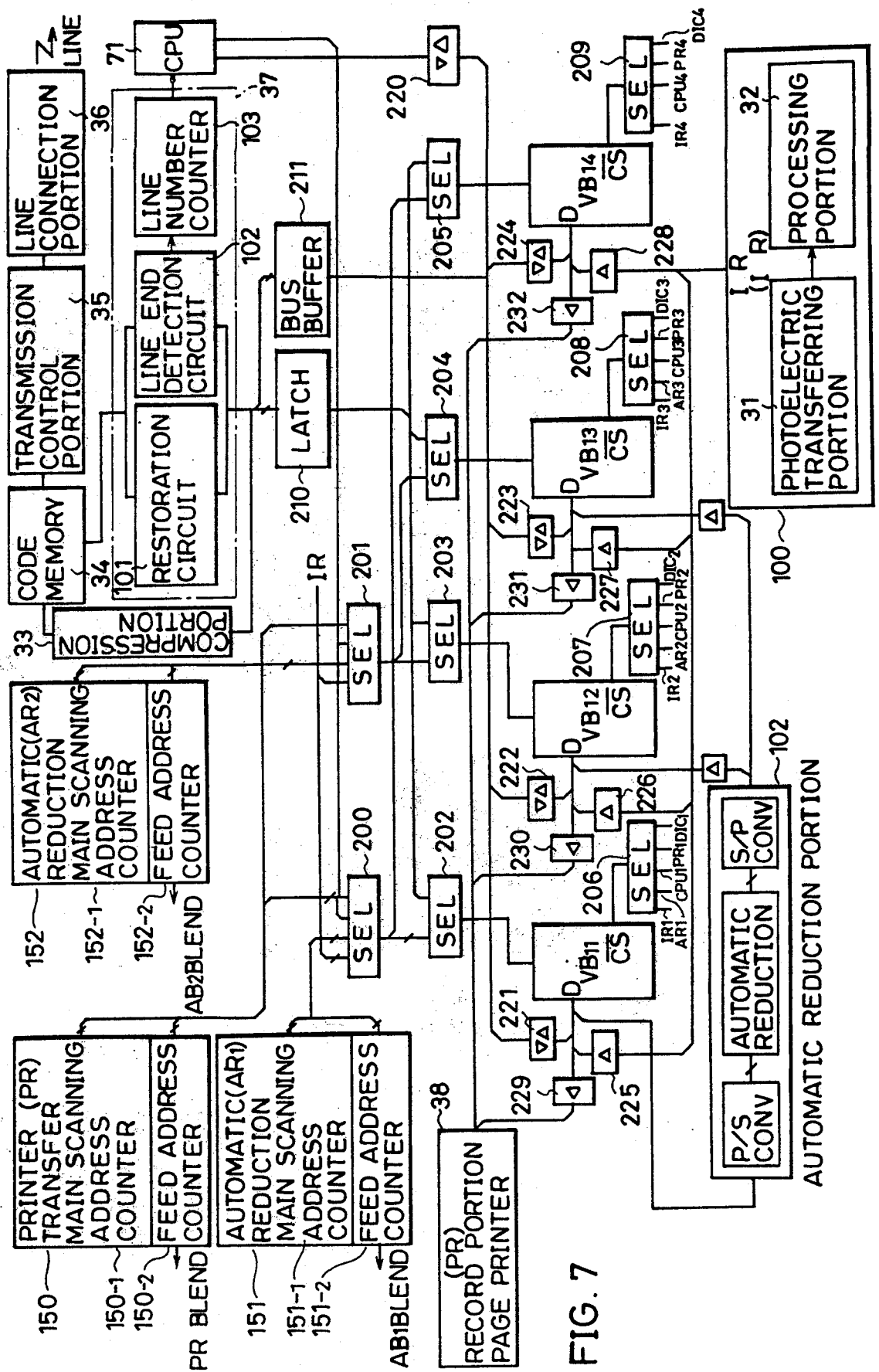
FIG. 7 is a diagram showing a specific structure of the main block in FIG. 2.

FIG. 7 is a diagram showing a specific structure of the main block in FIG. 2.

In the figure, the data received through line connection portion 36 and transmission control portion 35 is once stored in code memory 34. The encoded data stored in code memory 34 is expanded in expansion portion 37 by receiving a print instruction. Expansion portion 37 includes a restoration circuit 101 for restoring the encoded data supplied from code memory 34 to data for printing, a line end detection circuit 102 capable of detecting data of a line end indicating the end of one line by expanding the encoded data, and a line number counter 103 for counting the number of lines detected in line end detection circuit 102. That is, in expansion portion 37, the encoded data is expanded, and the number of data lines constituting the received data can be detected with the expanding operation. The image data expanded and restored by expansion portion 37 is written into a buffer memory VB11 at first. The data need not necessarily be written into buffer memory VB11 at first, and it may be first written into any of the buffer memories VB12, VB13, and VB14. After writing of the image data into buffer memory VB11 is finished, expansion portion 37 then starts writing the expanded image data into buffer memory VB12 in the same way. Subsequently, when writing of data into buffer memory VB12 is finished, the data is written into buffer memory VB13. In this embodiment, as the buffer memory includes four blocks, when writing of data into buffer memory VB13 is finished, CPU71 detects the termination of writing and sends a record start signal to record portion 38. Record portion 38 feeds recording paper from cassette 14a or 14b in response to the signal and sends a print start signal to CPU 71 when the recording paper reaches a prescribed position of the start of printing. CPU 71, receiving the signal, starts transferring the image data from buffer memory VB11 to record portion 38. At the same time, expansion portion 37 expands the next encoded data held in code memory 34 and writes the image data into buffer memory VB14 in the same way. In this case, only a gate 224 among gates 221 to 224 provided for each buffer memory VB11 to VB14 is in an enable state for the operation of buffer memory VB14 and other gates 221 to 224 are in a disenabled state. Gates 229 to 232 on the side of record portion 38 are operated as described below.

While data is read out from buffer memory VB11, only gate 229 is in the enable state and gates 230 to 232 are in the disenabled state. At this time, gate 220 is in the disenabled state as it is enabled only when CPU 71 accesses the buffer memory. Selectors 200 and 201 have selected addresses of each of the buffer memories to transfer the data to record portion 38. Selector 202 has selected an address of buffer memory VB11, selector 203 has selected an address of buffer memory VB12, and selector 204 has selected an address of buffer memory VB13. In this case, a reading operation is not being carried out, and gates 225 to 228 are in the disenabled state. A latch 210 and a bus buffer 211 are provided for performing a process in expansion portion 37 and compression portion 33, using a bus commonly as data bus and address bus in a time sharing manner.

Generally, as the expansion speed by expansion portion 38 is higher than the transfer speed to the printer, the operation of expanding and writing the encoded data into buffer memory VB14 is finished faster than the operation of transferring the data of buffer memory VB11. When writing of the image data into buffer memory VB14 is finished, the operation of expansion portion 37 is brought to a standby state. Then, when transfer of data from buffer memory VB11 to record portion 38 is finished, that is, a sub-scan address counter 150-2 for counting sub-scan addresses of data transferred to record portion 38 has counted a prescribed address, a PRBLEND signal representing the termination of transfer to the printer block is supplied from feed address counter 150-2 to CPU 71. As a result, data then starts being transferred to record portion 38 from buffer memory VB12 in the same way. CPU 71 starts transferring the next expanded data to buffer memory VB11 which has been emptied, by detecting the PRBLEND signal. When the transfer to the buffer memory is finished, data is transferred from the next buffer memory VB13 to record portion 38 in the same way and after the transfer is finished, the expanded data is transferred to buffer memory VB12. Thereafter, the process of expansion and transfer of data is successively performed in the same way.

The outline operation of each component in the receiving operation has been described above.

Figure 8:
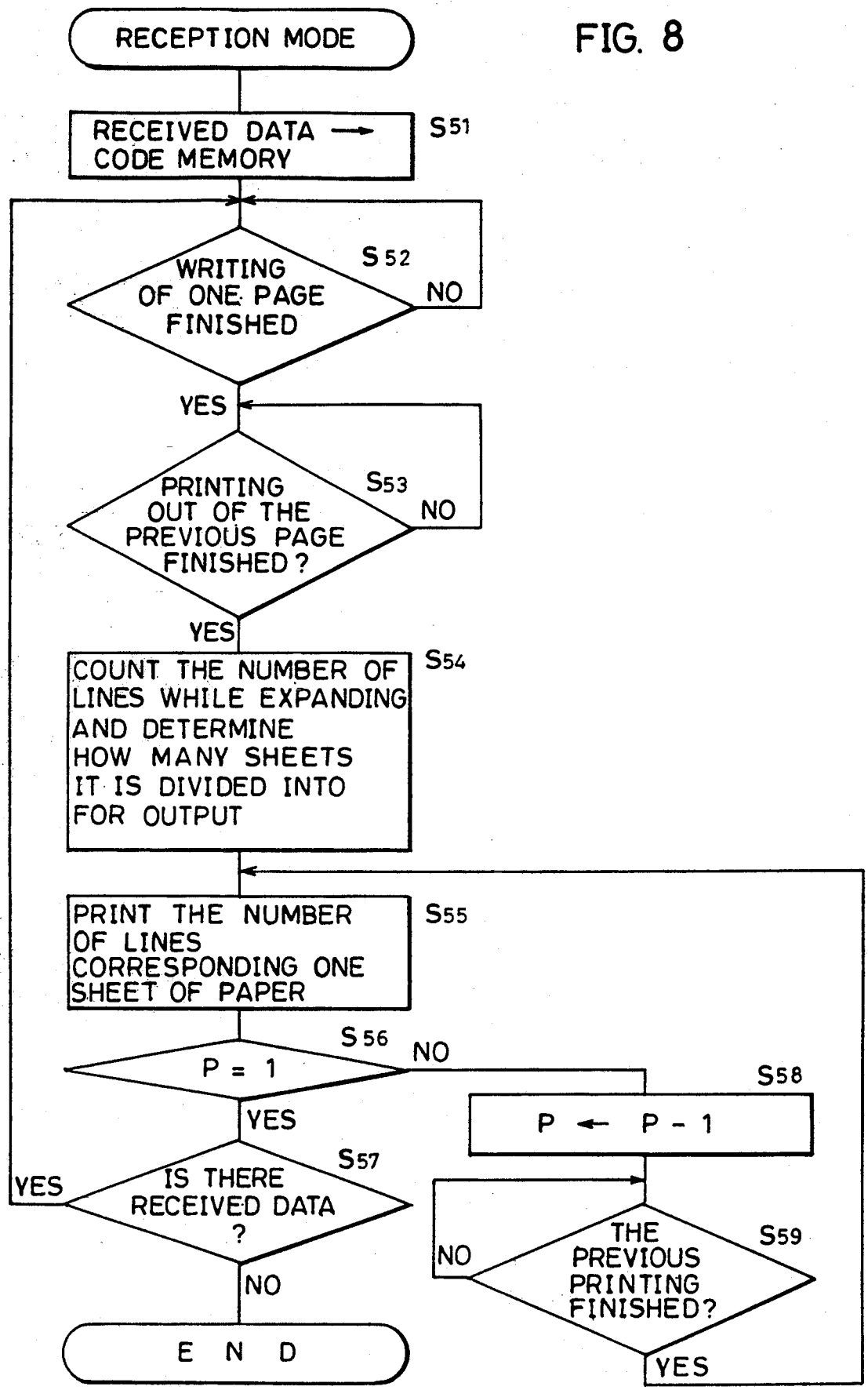
FIG. 8 is a flow chart according to the first embodiment showing specific contents of the reception mode in FIG. 5.

A specific processing operation in the reception mode according to a first embodiment of the present invention will now be described with reference to the flow chart of FIG. 8.

When the control mode is "1" and the flow enters the reception mode, the received data is once stored in code memory 34 in step S51. Then, a determination is made as to whether or not one page of transmission data has been written in the code memory in step S52. The determination is made by detecting a code indicating the page end of the received data. After writing of one page of received data into the code memory is finished, a determination is made as to whether printing out of the previous page in the printer is finished or not in step S53. After printing out of the previous page is finished, the encoded data stored in code memory 30 is expanded in restoration circuit 101 and the number of data lines constituting one entire page of received data is counted in line end detection circuit 102 at the same time in step S54. Then, a determination is made as to how many sheets of printing paper the one page of received data should be printed on based on the number of data lines counted.

For example, the number P of printing sheets can be determined according to the following equation:

$$P = INT\{l/(L+30)\} + 1,$$

wherein l is the length of the received data in mm. For example, if it is data at the time of the standard mode, 1 mm corresponds to 3.85 lines while 1 mm corresponds to 7.7 lines at the time of the fine mode.

L indicates a length in the longitudinal direction of paper used for printing. For example, if it is a sheet of paper of A4 size, L is 297 (mm), and L is 257 (mm) if it is of B5 size. 30 mm is provided in consideration of the incoming call printing and the call origination printing and the number P of printing sheets is determined so that even if the length l of the received data exceeds the length L of the paper, it is 1 as far as the excess amount is less than 30 mm.

Though the data stored in code memory 34 is expanded and then written into the buffer memory as stated above in step S54, the printing operation is not performed in this step as it is the purpose here to count the number of data lines. Accordingly, the expanded image data need not necessarily be written into the buffer memory.

Subsequently, in step S55, encoded data of the data line number corresponding to one sheet of printing paper is printed according to the number of printing sheets determined in step S54. Specifically, the operation is performed by expanding the encoded data stored in code memory 34 again in restoration circuit 101, writing the same into buffer memory 40 (VB11, VB12, VB13, VB14) once, and transferring the same to record portion 38 according to the procedure stated above.

In step S56, a determination is made as to whether the number P of printing sheets is 1. If a plurality of sheets are printed, it means the number P of printing sheets is not 1, so that the flow proceeds to step S58 and the number P of printing sheets is decremented by 1. Then, in step S59, after one page of printing is finished, the flow returns to step S55. Subsequently, a printing operation for the number of data lines corresponding to the second printing sheet is performed.

In this way, the operations in step S58 and step S59 are repeated until the number P of printing sheets is 1 and when the number P of printing sheets is equal to 1, the flow proceeds to step S57 and a determination is made as to whether new received data has been stored in code memory 34. If the new received data is stored therein, the flow returns to step S52, repeating the same operation as stated above while the operation in this reception mode is finished if new received data has not been stored in code memory 34.

Though, in the embodiment stated above, when the excess amount of the length of the received data with respect to the length of the paper is equal to or less than 30 mm, the excess image is discarded and is not printed, the device may be also adapted so that one entire page of image is reduced to be printed on one sheet of paper without discarding the excess portion.

Figure 9:
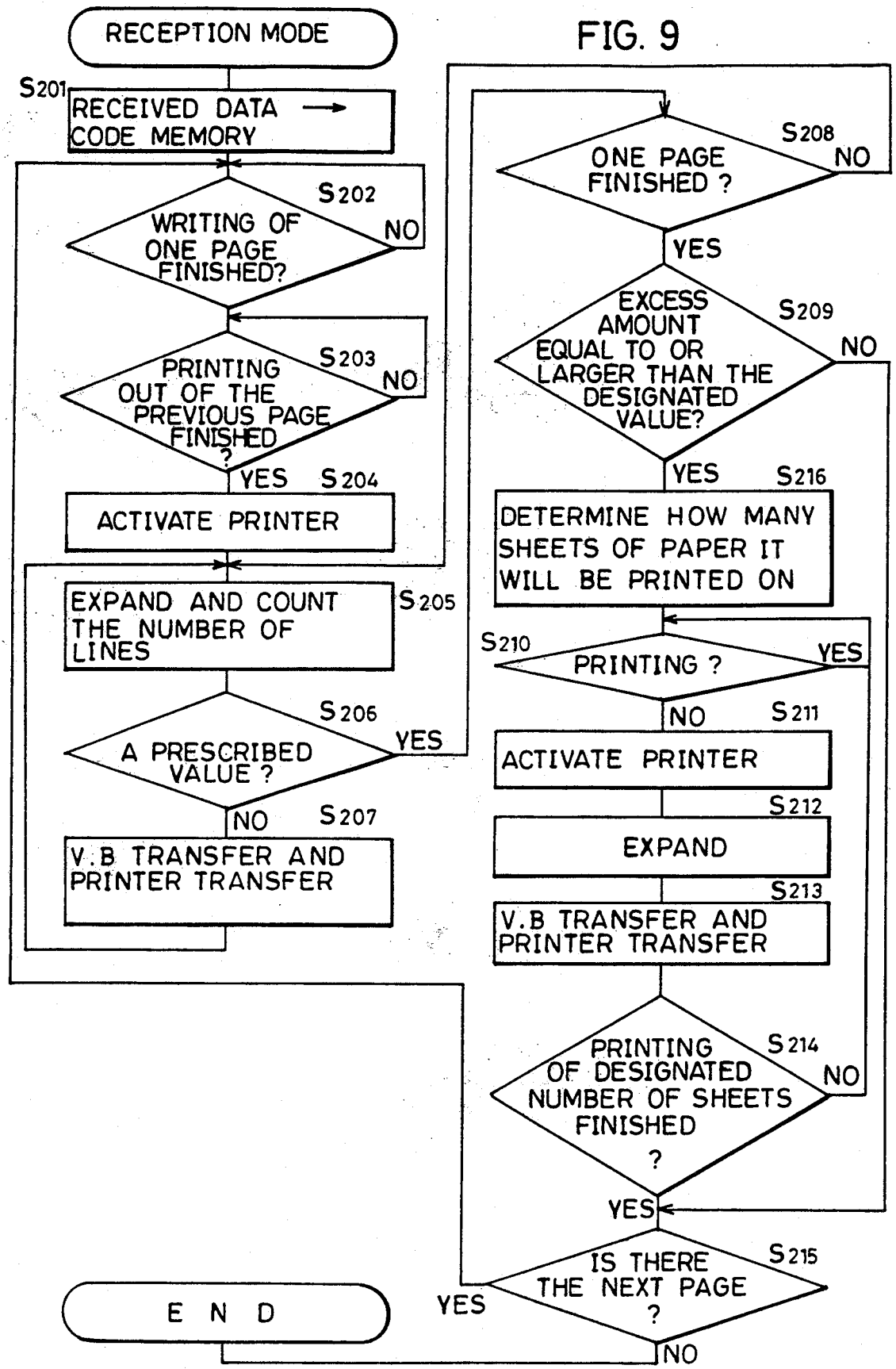
FIG. 9 is a flow chart according to the second embodiment showing specific contents of the reception mode in FIG. 5.

A specific processing operation in the reception mode according to a second embodiment of the present invention will now be described with reference to the flow chart of FIG. 9.

In the first embodiment, all the received data stored in the code memory were temporarily expanded once, the number of data lines constituting the data was counted, and then the number of printing sheets was determined. In this embodiment, the temporary expansion and the count operation of the data lines are not performed until the number of data lines required for printing one sheet is counted, and the printing operation is then performed along with the expanding and counting operations.

The operations from step S201 to step S203 are the same as those in the first embodiment. In this embodiment, the printer is activated in step S204 after printing out of the previous page is finished. That is, the cut paper is fed from cassette 14a or 14b. Then, in step S205, the number of data lines is counted while expanding the encoded data stored in code memory 34 in expansion portion 37. Then, in step S206, a determination is made as to whether the number of data lines has attained a prescribed value. In this embodiment, the number of data lines required for one sheet of printing paper is set as the prescribed value. That is, when a sheet of A4 size is selected as a sheet to be used for printing, the prescribed value is set to 1140 lines while the prescribed value is set to 985 lines when B5 size is selected. If the number of data lines of the expanded data has not reached the prescribed value, the expanded image data is transferred to the buffer memory and further transferred to record portion 38 and the printing operation is performed in step S207. That is, unlike the previous embodiment, data of the number of the data lines corresponding to one page of printing paper is directly printed out without the temporary expansion and counting of the number of data lines. In step S206, if the number of data lines counted exceeds the prescribed value, a determination is made as to whether one page of expanding operation of the received encoded data has been performed or not in step S208. If one page of the encoded data has not been processed, the flow returns to step S205 and expansion of the encoded data and the operation of counting the number of data lines are performed. That is, when the number of data lines exceeds the prescribed value, the number of data lines of all the encoded data corresponding to one page of the received data is counted.

If the number of all the lines corresponding to one page of the received data is counted, in step S209, a determination is made as to whether the excess amount of the number of data lines constituting one page of the received data is equal to or larger than a designated value 50 based on a prescribed value corresponding to the number of data lines of one printing sheet. If the excess amount is not equal to or larger than the designated value, it is determined that the excess amount is caused by the call origination printing or the reception printing and so on, and the data of the excess amount is not printed out, with the flow proceeding to step S215.

If the excess amount is equal to or larger than the designated value, a determination is made in step S216 as to how many sheets of printing paper are used for output based on the total number of the counted data lines constituting one page of the received data. When the number of sheets to be printed out is determined, after waiting until printing on the previous sheet is finished in step S210, the printer is activated in step S211. Then, the encoded data other than that printed out in the previous step is expanded again in step S212, transferred to the buffer memory, and then transferred to the record portion, and the printing operation is performed in step S213. The operation is performed the number of times corresponding to the designated number of printing sheets, so that a printing process of the encoded data of one page of the received data is performed (step S214).

Then, in step S215, a determination is made as to whether the received data includes the data of the next and following pages, and if it includes the data of the next and following pages, the flow returns to step S202 and repeats the same operation as stated above. If the data of the next and following pages is not stored in the code memory, the reception mode is ended.

Figure 10:
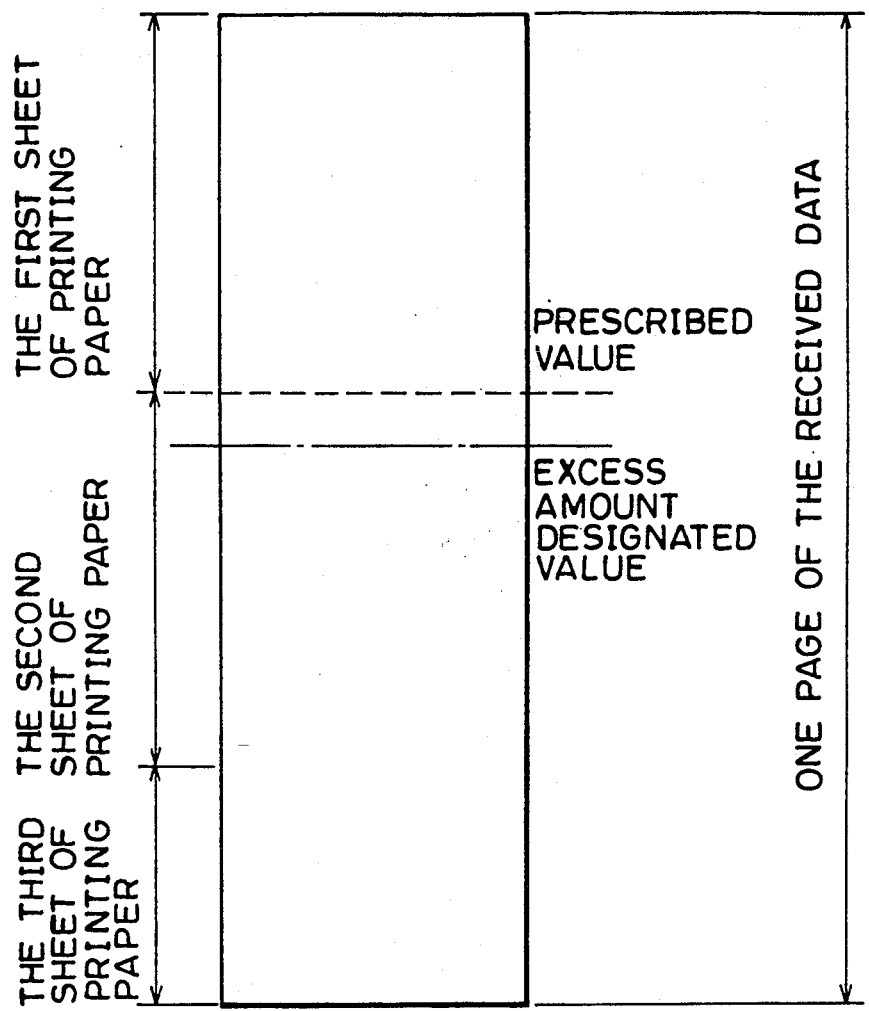
FIG. 10 is a diagram showing a specific example of received data for describing the flow chart in FIG. 9.

A specific example of the operation in the reception mode according to the second embodiment shown in FIG. 9 will now be described with reference to FIG. 10.

In the figure, suppose that one page of the received data is an original considerably longer than the number of normal data lines to be printed out. In this case, the amount of data as far as the prescribed value indicated by the broken line corresponds to a first sheet of printing paper received in the facsimile device.

The dot-and-dash line indicates a designated value for defining an excess amount used to determine whether printing out should be performed or not when the received data exceeds the prescribed value. In this example, it can be seen that one page of the received data includes the number of data lines having the excess amount which is far exceeding the designated value. Therefore, the received data as far as the prescribed value of the broken line is printed out as it is without the temporary expansion and the operation of counting the number of data lines being performed. The temporary expansion of the encoded data and the counting operation of the number of data lines are performed till the end of one page of the received data exceeding the prescribed value, so that the number of data lines of data exceeding the prescribed value is counted. The number of data lines to be outputted as the second printing sheet and the third printing sheet is counted based on the counted data, thereby allowing one page of the received data to be recorded on the first to third printing sheets of cut paper.

Figure 11:
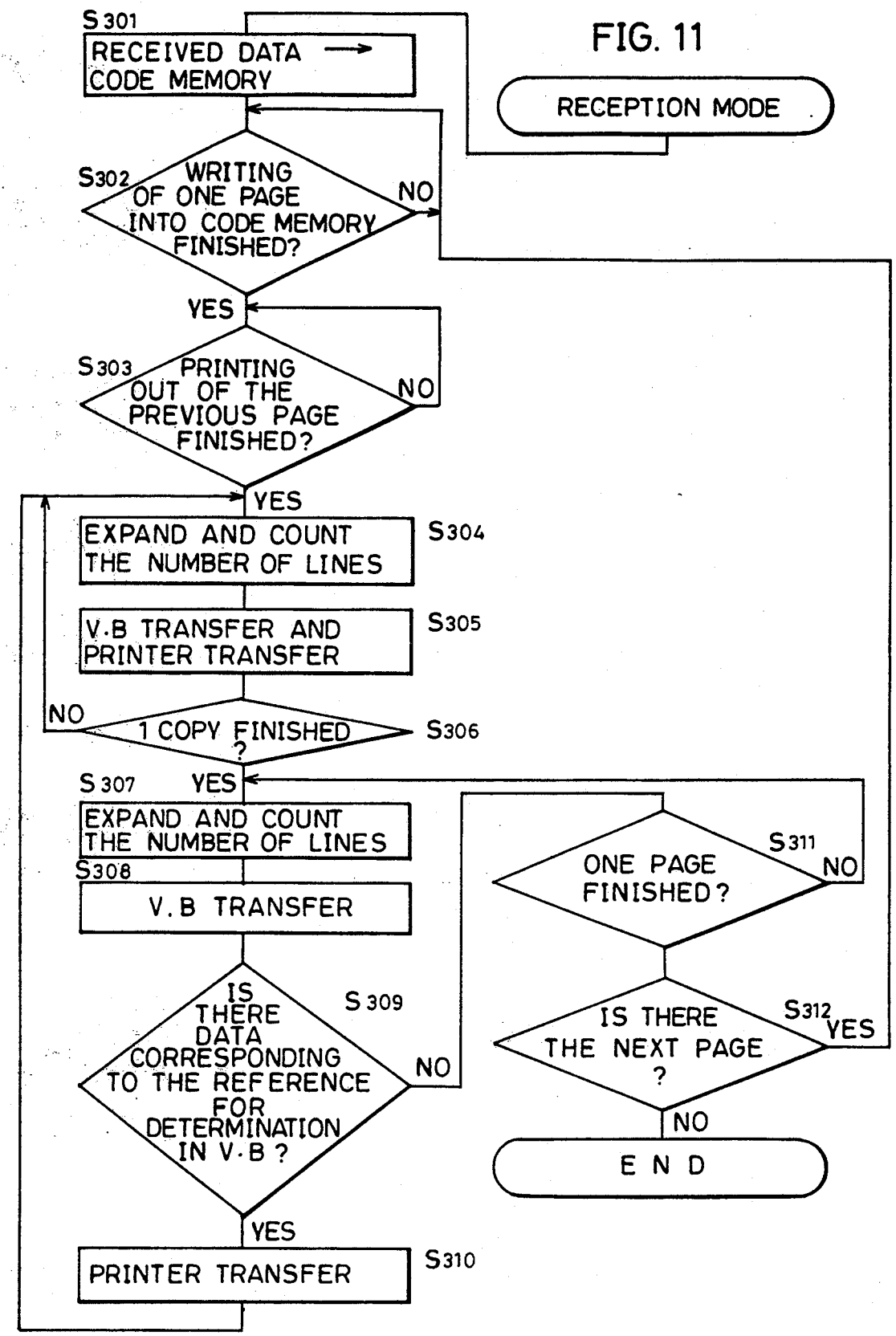
FIG. 11 is a flow chart according to the third embodiment showing specific contents of the reception mode in FIG. 5.
Figure 12:
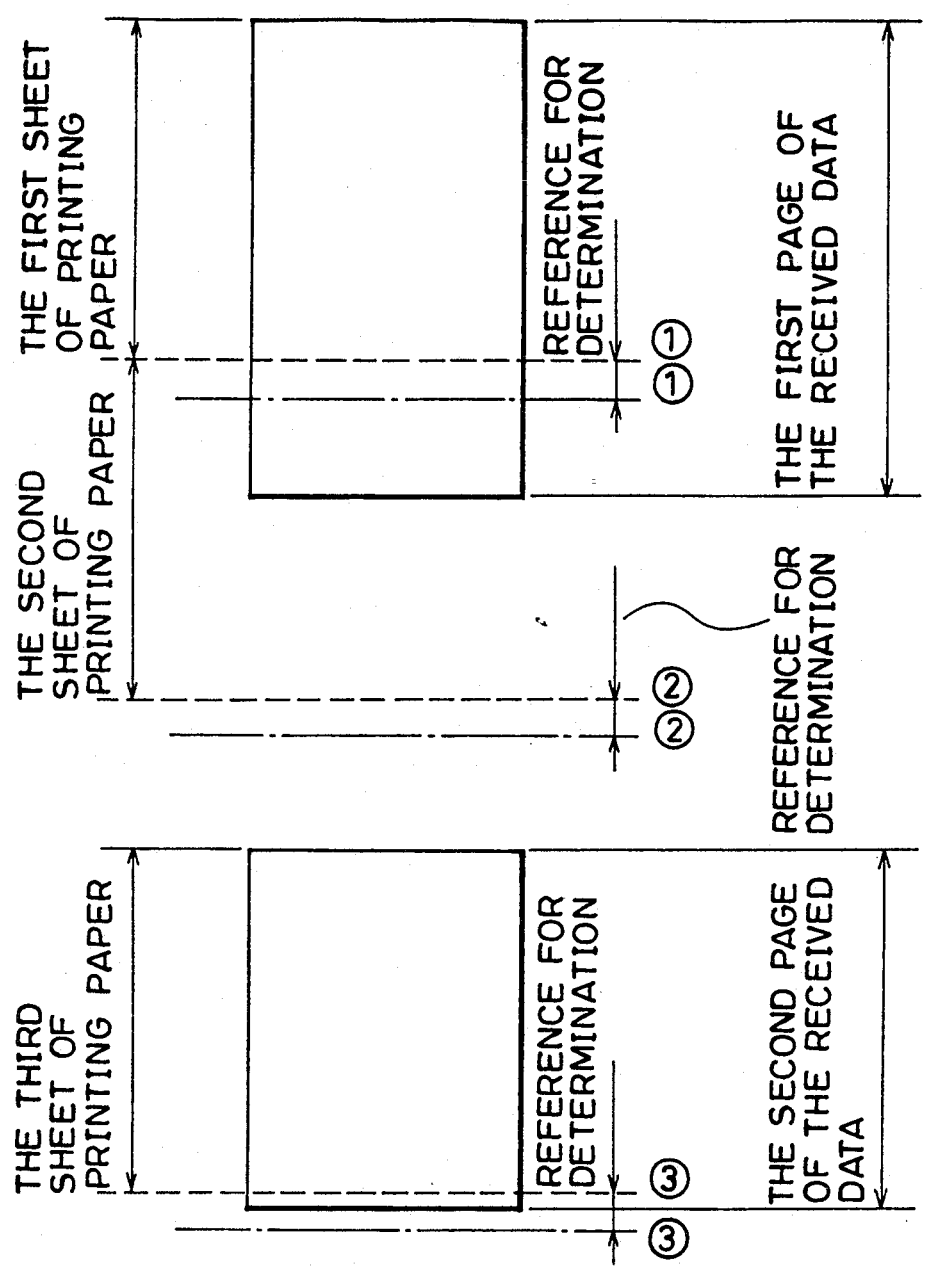
FIG. 12 is a diagram showing a specific example of received data for describing the flow chart in FIG. 11.

FIG. 11 is a flow chart according to a third embodiment of the present invention, illustrating specific contents of the reception mode of FIG. 5, and FIG. 12 is a diagram showing one example of received data for describing the flow chart.

The flow chart will now be described with reference to the specific example in FIG. 12.

When the control mode becomes "1", the program of the reception mode is executed, storing the received data in code memory 30 in step S301. In this example, two pages of the received data is stored in code memory 30. In step S302, a determination is made as to whether or not writing of one page of the received data into the code memory has been finished. If writing of one page has been finished, a determination is made as to whether printing out of the previous page of the data which has been already received is finished or not in step S303. If the printing out of the previous page is finished, the encoded data of the first page of the received data is expanded and the number of data lines constituting the data is counted in step S304. Then, the expanded image data is transferred to the buffer memory and transferred to the record portion from the buffer memory.

Then, in step S306, a determination is made as to whether output of the first printing sheet in the record portion is finished. In this example, the image data as far as the broken line ① corresponds to the amount of output of the first printing sheet in the record portion. After output of the first printing sheet is finished, the encoded data of the first page of the received data beginning with the broken line ① is expanded and the number of lines is counted in step S307. Similarly, the expanded image data is transferred to the buffer memory in step S308.

Then, in step S309, a determination is made as to whether there is image data corresponding to the designated value 50 lines to be a reference for determination within the buffer memory based on the count result in step S307. In this embodiment, one buffer memory has an amount of data corresponding to a reference for determination. However, one buffer memory need not necessarily have the amount of data corresponding to the reference for determination and there may be separately provided means for detecting whether there is image data of the amount corresponding to the reference for determination.

In this example, the amount of the reference for determination corresponds to the amount of the image data interposed between the broken line ① and the dot-and-dash line ①. If there is data of the amount of the reference for determination, the data of the amount of the reference for determination is transferred to the record portion in step S310 and the flow returns to step S304. That is, if there is data of the amount of the reference for determination within the buffer memory, the processes of step S304 and the following steps are performed so that the image data in the portion is outputted.

In this example, the image data between the broken line ① and the end of the remaining portion of the first page of the received data is larger than the amount of the reference for determination, so that the image data in the portion is transferred to the printer portion so as to be outputted on the second sheet of printing paper. Therefore, in this case, the same process as in the image processing for the first sheet of printing paper is performed as the image processing for the second sheet of printing paper. That is, the encoded data from the broken line ① to the end of the first page of the received data is each expanded, the number of data lines is counted and the expanded data is transferred to the buffer memory. Since the data from the end of the first page of the received data to the end of the second sheet of printing paper, i.e., the broken line ② is not included in the first page of the received data, white data for the portion is transferred to the buffer memory and then transferred to the record portion.

When processing of the image data up to the broken line ② is finished, the flow proceeds to step S311 from step S309 and image processing for the second sheet of printing paper is finished as data corresponding to the amount of the reference for determination is not included in the second sheet of printing paper. In this example, as the received data includes the second page, the flow proceeds to step S312 after recording and outputting of the first page is finished in step S311. Then, the flow returns to step S302 for the process of the second page of the received data.

The second page of the received data is processed in the same way as in the processes stated above as image processing for the third sheet of printing paper as far as the broken line ③. Then, after outputting of the third sheet of printing paper is finished, the encoded data beginning with the broken line ③ is expanded, the number of data lines is counted in step S307 and the expanded data is transferred to the buffer memory. In this case, the excess amount with respect to a part of the second page of the received data interposed between the broken line ③ and the dot-and-dash line ③, i.e., the image data of the third sheet of printing paper does not reach the amount of the image data corresponding to the amount of the reference for determination. Accordingly, the image data in the portion is not transferred to the record portion and the flow proceeds to step S311, so that the data is discarded without being recorded. In this way, processing of the second page of the received data is also finished and the image processing in the reception mode is finished.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A facsimile device, comprising:
reception means for receiving compressed image data transmitted by another facsimile device;
storage means for storing the compressed image data received by said reception means;
first expansion means for expanding the compressed image data stored in said storage means;
detection means for detecting the amount of the image data expanded by said first expansion means;
comparison means for comparing the amount of the image data detected by said detection means and a prescribed value and obtaining the difference therebetween;
second expansion means for expanding again the compressed image data stored in said storage means after the detection by said detection means;
image formation means for forming an image on paper based on the image data expanded by said second expansion means; and
control means for controlling said image formation means based on the difference obtained by said comparison means, wherein said control means determines how many sheets of paper said received image data is to be formed on based on the difference obtained by said comparison means.

2. A facsimile device, comprising:
reception means for receiving compressed image data transmitted by another facsimile device;
storage means for storing the compressed image data received by said reception means;
expansion means for expanding the compressed image data stored in said storage means;
detection means for detecting the amount of the image data expanded by said expansion means, said expansion means expanding again the compressed image data stored in said storage means after the detection by said detection means;
determination means for determining how many sheets of paper said received image data is to be printed on based on the amount of the image data detected by said detection means; and
print means responsive to the determination by said determination means for printing on paper the image data expanded by said expansion means.

3. The facsimile device according to claim 2, wherein said detection means detects the length of the image corresponding to one page in the image data expanded by said expansion means, and
said determination means determines to divide the image data so as to separately print each of the divided image data on two sheets of paper to be printed when the length of the image detected by said detection means exceeds a prescribed value.

4. A facsimile device, comprising:
reception means for receiving code data corresponding to a plurality of pages transmitted by another facsimile device;
storage means for storing the code data received by said reception means;
decode means for decoding the code data received by said reception means to image data;
print means for printing on paper an image corresponding to the decoded image data in parallel with the decoding process by said decode means;
count means for counting the length of the image corresponding to one page of the image data to be decoded by said decode means;
first control means for inhibiting printing image data to be decoded after the counted value by said count means reaches a first prescribed value; and
second control means for controlling said decode means and said print means so that said decode means decodes the code data corresponding to said image data inhibited from being printed to image data again and said print means prints an image corresponding to the image data decoded again on another sheet of paper when the excess amount of said counted value with respect to said first prescribed value is larger than a second prescribed value.

5. A facsimile device, comprising:
reception means for receiving code data corresponding to a plurality of pages transmitted by another facsimile device;
decode means for decoding the code data received by said reception means to image data;
print means for printing on paper an image corresponding to the image data decoded by said decode means;
count means for counting the length of the image corresponding to one page of the image data decoded by said decode means;
first control means for inhibiting printing of image data to be decoded after the counted value by said count means reaches a first prescribed value; and
second control means for controlling said decode means so as to decode the code data to be decoded after said counted value reaches said first prescribed value to image data again when the excess amount of said counted value with respect to said first prescribed value is larger than a second prescribed value.

6. A facsimile device, comprising:
reception means for receiving compressed image data transmitted by another facsimile device;
storage means for storing the compressed image data received by said reception means;
first expansion means for expanding the compressed image data stored in said storage means;
detection means for comparing the amount of the image data expanded by said first expansion means and a first prescribed value and detecting the excess amount of the amount of said expanded image data with respect to said first prescribed value;
second expansion means for expanding again the compressed image data at least corresponding to said excess amount after the detection by said detection means;
image formation means for forming an image on paper based on the image data expanded by said second expansion means; and
control means for inhibiting the operation of said second expansion means when said excess amount is equal to or less than a second prescribed value.

7. A facsimile device, comprising:
reception means for receiving compressed image data transmitted by another facsimile device;
storage means for storing the compressed image data received by said reception means;
first expansion means for expanding the compressed image data stored in said storage means;

detection means for comparing the amount of the image data expanded by said first expansion means and a first prescribed value and detecting the excess amount of the amount of said expanded image data with respect to said first prescribed value;

second expansion means for expanding again the compressed image data at least corresponding to said excess amount after the detection by said detection means;

image formation means for forming an image on paper based on the image data expanded by said second expansion means;

determination means for determining how many sheets of paper said received image data is to be formed on based on the excess amount detected by said detection means; and control means for controlling said image formation means based on the determination by said determination means.

8. A method of recording in a facsimile device, comprising the steps of:

receiving code data corresponding to a plurality of pages transmitted by another facsimile device;

storing said received code data;

decoding said received code data to image data;

printing an image corresponding to said decoded image data on paper;

counting the number of lines of the image corresponding to one page of said decoded image data;

inhibiting printing of image data to be decoded after the counted value in said counting reaches a first prescribed value while continuing to count the number of said lines; and decoding code data corresponding to said image data inhibited from being printed to image data again and printing an image corresponding to the image data on another sheet of paper when the excess amount of said counted value with respect to said first prescribed value is larger than a second prescribed value.

9. A facsimile device, comprising:

reception means for receiving code data corresponding to a plurality of pages transmitted by another facsimile device;

storage means for storing the code data received by said reception means;

decode means for decoding the code data received by said reception means to image data;

print means for printing an image corresponding to the decoded image data on paper in parallel with the decoding operation by said decode means;

count means for counting the length of the image of one page of the image data decoded by said decode means;

first control means for controlling said print means so as to hold printing of image data to be decoded after the counted value by said count means reaches a first prescribed value; and second control means for controlling said print means so as to start the printing operation again and print on another sheet of paper an image corresponding to said image data which has been held from being printed when the excess amount of said counted value with respect to said first prescribed value is larger than a second prescribed value.

* * * * *